Nov. 5, 1935.    C. H. HAVILL    2,020,180
SUPERCHARGER
Original Filed Aug. 26, 1931
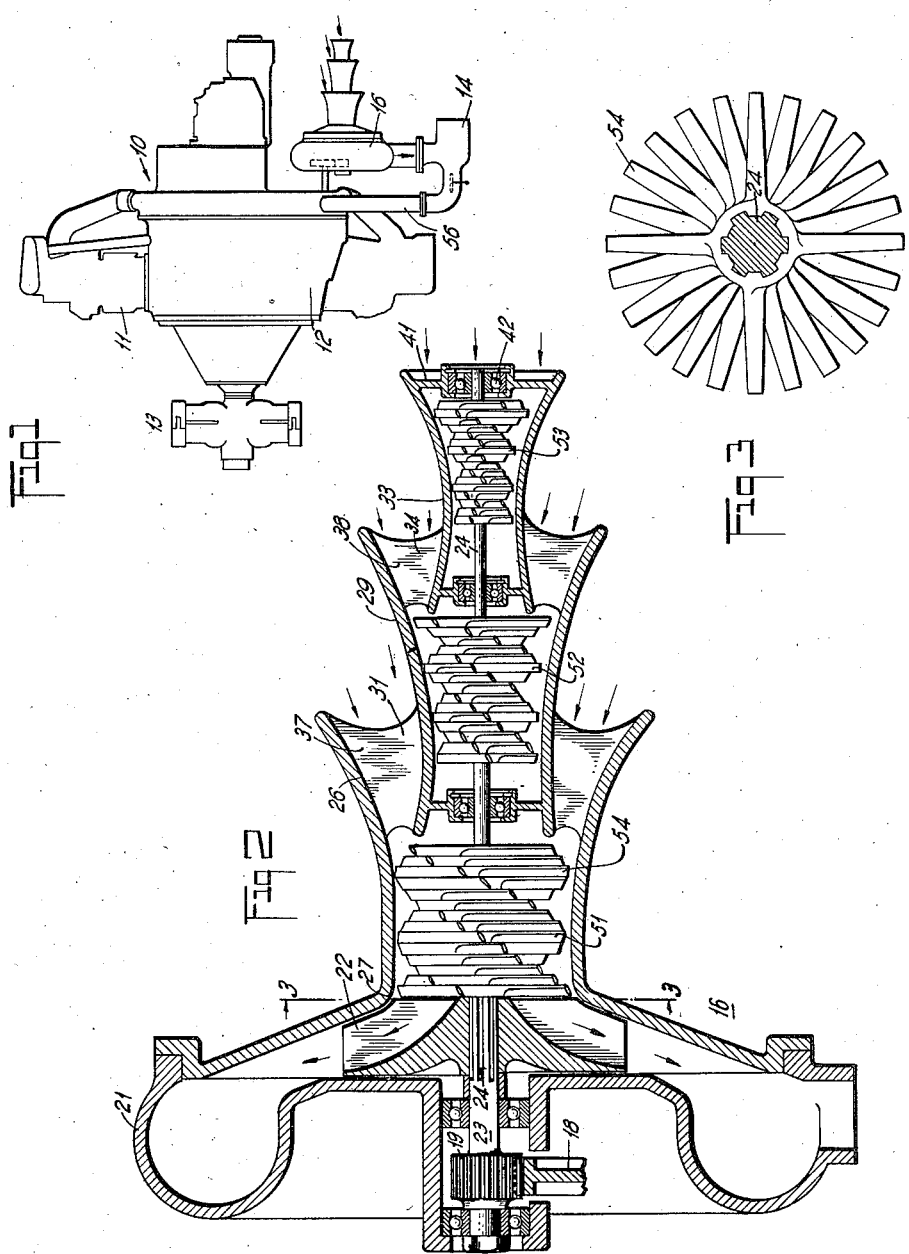
INVENTOR
Clinton H. Havill
BY
F. B. Smith
ATTORNEY Patented Nov. 5, 1935

2,020,180

UNITED STATES PATENT OFFICE 2,020,180

SUPERCHARGER

Clinton H. Havill, South Orange, N. J., assignor to Bendix Research Corporation, East Orange, N. J., a corporation of Indiana Application August 26, 1931, Serial No. 559,531
Renewed May 10, 1935

4 Claims. (Cl. 230—104)

This invention relates to fluid pumps or compressors, and more particularly to a means for increasing the efficiency of engine superchargers.

One of the objects of the invention is to provide a fluid compressor in which the fluid pressure is materially increased at the supercharger inlet.

Another object of the invention is to provide a compressor or supercharger in which the inlet air is cooled in its passage toward the supercharger inlet.

Another object of the invention is to provide a compressor or supercharger in which the inlet air is pre-conditioned by giving it a preliminary velocity and mixing it with air from the atmosphere prior to its entry to the supercharger.

Another object of the invention is to provide a compressor or supercharger in which the air is increased in velocity throughout a succession of graduated steps.

Another object of the invention is to provide a fluid pump in which the fluid is both cooled and increased in velocity through a series of graduated steps.

Other objects and features of the invention will appear from the following description of a preferred embodiment which is illustrated in the accompanying drawing, in which:

Fig. 1 is a somewhat diagrammatical elevational view of an engine, showing the supercharger in its assembled relation;

Fig. 2 is a view in cross section taken axially of the supercharger; and,

Fig. 3 is a view of one of the rotary fans taken in the direction of line 3—3 of Fig. 2.

In the drawing, 10 represents a conventional engine of the radial type having cylinders 11, crankcase 12, propeller hub 13, and carburetor 14. Supercharger or compressor 16 is shown as having its outlet secured to the carburetor inlet, but if preferred, this arrangement may be changed and the supercharger installed between the carburetor and the engine.

The supercharger is driven from the engine by any suitable means, such as gears 18 and 19, and comprises a housing 21 within which is a centrifugal impeller 22 secured to shaft 23 by any suitable means such as splines 24, it being understood that shaft 23 is keyed or otherwise secured to gear 19. The inlet conduit 26 of housing 21 is substantially Venturi-shaped and arranged to have its outer portion coverge toward the inlet 27, wherein the fluid passing through the conduit 26 meets the central portion of impeller 22 and is thrown by centrifugal force in the direction of the arrows to the outer portion of the casing and from thence forced to the carburetor 14.

A second venturi 29, which is similar in shape to conduit 26, is nested within the entrance opening of conduit 26 and spaced therefrom to form an annular air passage 31 through which air enters and mixes with the air flowing through the inside of conduit 29. If desired, a third conduit 33 similar in shape to the other conduits may also be installed in the entrance opening of conduit 29 and arranged in a similar fashion to provide an annular air opening 34. Each of the two outer venturis is supported in its adjacent venturi by bridges 37 and 38, the outermost venturi 33 acting as a support for the outer end of shaft 23 by means of bridges 41 in which the shaft is supported by bearing 42, similar bearings being provided intermediate the ends of the shafts for additional support.

Within the venturis are rotary fans or impellers 51, 52, and 53, respectively, each of which is similar in form and only one of which will be described. Impeller 51, which is taken as an illustrative example, comprises a series of helically arranged fan plates 54, each of which is composed of a plurality of fan blades of different pitches so arranged on shaft 23 that the pitch increases toward the entrance 27 of the supercharger.

It is commonly known that the velocity of a fluid is increased by passing it through a venturi without materially reducing the efficiency of the conduit, and therefore it may be readily seen that even though the rotary fans were omitted, the air velocity would increase from the entrance of each venturi toward its discharge opening. As it is desired to have each fan impart additional velocity to the air, the pitch of each fan of the series is increased to an extent whereat each blade imparts a velocity to the air beyond that which it would normally attain by virtue of the decrease in Venturi tube area.

It may be readily seen that both the venturi and the rotary fan act to increase the air velocity and thereby deliver the air charge to the impeller 22 with an initial velocity and a somewhat higher pressure than would be obtained if the air were taken directly from the surrounding atmosphere.

The nested conduits or venturis 26, 29, and 33 are preferably graduated in size and of similar shape, but such an arrangement is not essential and, if preferred, the conduits may be made of other sizes and shapes so long as the inlet portions of each of the respective conduits converge toward their outlets. It is also preferred to have the rotary fans 51, 52, and 53 closely approximate the interior shape of the venturis, but satisfactory operation may be obtained by constructing the respective fans of a similar size and to have the fans only approximately fill the interior of the respective venturis.

In the operation of the device, impeller 22 tends to normally produce a slight vacuum at the entrance 27 which is offset by the pressure of the air forced through the series of Venturi tubes and which, in some cases, is delivered to inlet 27 under a slight super-atmospheric pressure. The air entering the outmost venturi 33 is increased in velocity by the rotating fan 53 and delivered within the reduced portion of venturi 29, wherein it is mixed with cool atmospheric air through the annular passage 34. The combined charge then receives additional velocity by virtue of the rotating fan 52 and shape of the Venturi tube 29, from which it is delivered to the reduced portion of venturi 26 and again increased in velocity and pressure and ultimately delivered to the entrance 27, from whence it is thrown outwardly by impeller 22 and delivered to the engine through carburetor 14 and manifold 56.

While a preferred embodiment of the invention has been illustrated and described, it is understood that this showing and description are illustrative only and that the invention is not regarded as limited to the form illustrated and described, or otherwise, except by the terms of the following claims.

What is claimed is:

1. A fluid compressor comprising a centrifugal impeller and a series of substantially Venturi-shaped inlet conduits, said conduits arranged in a nested series with annular air inlet spaces between adjacent conduits, and power driven fan means axially arranged in the Venturi-shaped conduits to progressively increase the fluid velocity as it passes through the conduits, whereby the fluid is delivered to the central portion of the impeller with a high initial velocity, said conduits being graduated in size, and the smaller of said conduits having fan supporting bearings adjacent each of the respective outlets.

2. A fluid compressor comprising a centrifugal impeller and a series of substantially Venturi-shaped inlet conduits, said conduits being graduated in size and arranged in a nested series with annular air inlet spaces between adjacent conduits, and a power driven Venturi-shaped fan in each conduit arranged to progressively increase the fluid velocity beyond the normal increase in velocity due to Venturi action as it passes through the conduits, whereby the fluid is delivered to the central portion of the impeller with a high initial velocity, and a bearing in the outermost conduit adjacent the inlet end thereof for supporting the fan.

3. A fluid compressor comprising a centrifugal impeller, a series of nested inlet conduits arranged coaxially of the impeller, said conduits having portions convergent toward their discharge ends, a shaft secured to the impeller extending through said conduits, a shaft bearing supported by each of the outer conduits, fans secured to said shaft, each fan having a series of blades substantially corresponding to the contour of each conduit, and means to rotate said impeller and shaft as a unit.

4. A fluid compressor comprising a centrifugal impeller, a series of nested Venturi-shaped conduits for the compressor arranged coaxially of the impeller, each of said conduits having a bearing supported therein adjacent its discharge end, the outermost of said conduits having a bearing supported therein adjacent its inlet end, a shaft secured to said impeller rotatably mounted in said bearings, said shaft having a plurality of series of fan blades secured thereto, the fan blades of each series being in staggered relation to each other and of a length substantially the same as the corresponding diameter of the conduit, and the outermost fan blade of those series which are intermediate the last series and the impeller being rotatably supported in proximity to the discharge end of the adjacent conduit.

CLINTON H. HAVILL.